(12) United States Patent
Tanahashi

(10) Patent No.: US 10,910,981 B2
(45) Date of Patent: Feb. 2, 2021

(54) ELECTRIC POWER CONVERSION SYSTEM AND CONTROL METHOD OF ELECTRIC POWER CONVERSION SYSTEM

(71) Applicant: TOYOTA JIDOSHA KABUSHIKI KAISHA, Toyota (JP)

(72) Inventor: Fumiki Tanahashi, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 90 days.

(21) Appl. No.: 16/297,157

(22) Filed: Mar. 8, 2019

(65) Prior Publication Data

US 2019/0305710 A1 Oct. 3, 2019

(30) Foreign Application Priority Data

Mar. 28, 2018 (JP) ................... 2018-062251

(51) Int. Cl.
| | | |
|---|---|---|
| H02P 27/06 | (2006.01) | |
| H02M 7/5387 | (2007.01) | |
| H02P 29/028 | (2016.01) | |
| H02P 29/60 | (2016.01) | |
| H02M 1/32 | (2007.01) | |

(Continued)

(52) U.S. Cl.
CPC .............. *H02P 27/06* (2013.01); *H02M 1/32* (2013.01); *H02M 7/539* (2013.01); *H02M 7/5387* (2013.01); *H02M 7/53871* (2013.01); *H02P 29/027* (2013.01); *H02P 29/028* (2013.01); *H02P 29/60* (2016.02); *H02P 29/68* (2016.02); *H02M 3/158* (2013.01); *H02M 2001/007* (2013.01); *H02M 2001/0048* (2013.01); *H02M 2001/325* (2013.01); *H02M 2001/327* (2013.01); *H02P 2201/07* (2013.01); *H02P 2201/11* (2013.01)

(58) Field of Classification Search
CPC .......... H02P 27/06; H02P 27/08; H02P 29/60; H02P 2207/05; H02P 29/028; H02P 29/032; H02M 1/32; H02M 7/219; H02M 7/5387; H02M 7/53871; H02M 3/00; H02M 3/1582
See application file for complete search history.

(56) References Cited

U.S. PATENT DOCUMENTS

| | | | |
|---|---|---|---|
| 7,595,597 B2 * | 9/2009 | King ...................... | B60L 50/40 318/139 |
| 2004/0165868 A1 | 8/2004 | Sato et al. | |

(Continued)

FOREIGN PATENT DOCUMENTS

| | | |
|---|---|---|
| CN | 106660455 A | 5/2017 |
| DE | 102014201440 A1 | 7/2015 |

(Continued)

*Primary Examiner* — Thai T Dinh
(74) *Attorney, Agent, or Firm* — Oliff PLC

(57) ABSTRACT

An electric power conversion system includes: an inverter; a voltage converter including a high-voltage end connected to a direct-current power source and a low-voltage end connected to the inverter; and a controller. The controller is configured to control switching elements such that a voltage of the low-voltage end becomes lower than a voltage of the high-voltage end in a first state. The controller is configured to control the switching elements such that the voltage of the low-voltage end becomes equal to the voltage of the high-voltage end in a second state.

9 Claims, 7 Drawing Sheets

(51) Int. Cl.
    *H02P 29/024*     (2016.01)
    *H02M 7/539*     (2006.01)
    *H02P 29/68*     (2016.01)
    H02M 3/158     (2006.01)
    H02M 1/00     (2006.01)

(56) References Cited

U.S. PATENT DOCUMENTS

| | | | |
|---|---|---|---|
| 2012/0086417 A1* | 4/2012 | Osada | B60L 58/33 |
| | | | 323/271 |
| 2015/0077964 A1* | 3/2015 | Lim | B60R 16/033 |
| | | | 361/818 |
| 2015/0115708 A1* | 4/2015 | Berry | B60L 58/20 |
| | | | 307/10.1 |
| 2015/0130423 A1* | 5/2015 | Tajima | B60L 15/2009 |
| | | | 320/137 |
| 2016/0248107 A1* | 8/2016 | Matsumoto | H01M 8/04753 |
| 2017/0201113 A1* | 7/2017 | Gazit | H02J 7/00 |
| 2017/0217313 A1 | 8/2017 | Hashimoto | |
| 2019/0181633 A1* | 6/2019 | Nozawa | H02P 27/06 |

FOREIGN PATENT DOCUMENTS

| | | |
|---|---|---|
| JP | 2012-016239 A | 1/2012 |
| JP | 2017-093055 A | 5/2017 |
| WO | 038/015254 A1 | 2/2003 |
| WO | 2012/004647 A2 | 1/2012 |
| WO | 2016/013158 A1 | 1/2016 |

* cited by examiner

ELECTRIC POWER CONVERSION SYSTEM AND CONTROL METHOD OF ELECTRIC POWER CONVERSION SYSTEM

INCORPORATION BY REFERENCE

The disclosure of Japanese Patent Application No. 2018-062251 filed on Mar. 28, 2018 including the specification, drawings and abstract is incorporated herein by reference in its entirety.

BACKGROUND

1. Technical Field

The present specification discloses a technique related to an electric power conversion system that converts electric power of a direct-current power source to drive electric power of a traveling motor, and a control method of an electric power conversion system.

2. Description of Related Art

Electric power conversion systems that convert electric power of a direct-current power source into drive electric power of a traveling motor are disclosed in WO 2003/015254 and Japanese Patent Application Publication No. 2017-093055 (JP 2017-093055 A). The electric power conversion system of WO 2003/015254 includes a boost converter that boosts electric power of the direct-current power source, and an inverter that converts the boosted direct-current electric power into alternating-current electric power. The electric power conversion system of JP 2017-093055 A includes a first voltage converter that boosts the voltage of a first direct-current power source, a second voltage converter that steps down the voltage of a second direct-current power source, and an inverter that converts the electric power output from the first and second voltage converters into alternating-current electric power. Both the boost converters of WO 2003/015254 and the first and second voltage converters of JP 2017-093055 A are chopper converters including a switching element for power conversion, and a reactor.

SUMMARY

Since a large current flows in an electric power conversion system for an electric vehicle, the amount of heat generation in the electric power conversion system is large. When the current or electric power supplied to a traveling motor is large in particular, the current flowing into the electric power conversion system also becomes large. Hence, the amount of heat generation increases. A chopper voltage converter generates a pulsating current with on-off of a switching element, and the switching element itself and a reactor generate heat. The present disclosure relates to an electric power conversion system that converts electric power of a direct-current power source into drive electric power of a traveling motor, the electric power conversion system suppressing the amount of heat generation when the current or electric power supplied to the traveling motor is large.

A first aspect of the present disclosure is an electric power conversion system that converts electric power of a direct-current power source into drive electric power of a traveling motor. The electric power conversion system includes: an inverter; a voltage converter; and a controller. The inverter is configured to supply alternating-current electric power to the traveling motor. The voltage converter includes a high-voltage end connected to the direct-current power source and a low-voltage end connected to the inverter. The voltage converter includes switching elements and a reactor, and is configured to step down the voltage of the direct-current power source and supply the voltage of the direct-current power source to the inverter. The controller is configured to control the voltage converter. The controller is configured to control the switching elements such that the voltage of the low-voltage end becomes lower than the voltage of the high-voltage end in a first state. The first state is at least one state out of a state where a current flowing to the inverter is less than a prescribed current threshold and a state where electric power consumed in the traveling motor is less than a prescribed electric power threshold. The controller is configured to control the switching elements such that the voltage of the low-voltage end becomes equal to the voltage of the high-voltage end in a second state. The second state is at least one state out of a state where the current flowing to the inverter is more than the prescribed current threshold and a state where the electric power consumed in the traveling motor is more than the prescribed electric power threshold. The phrase "less than the threshold" may be "equal to or less than the threshold". The phrase "more than the threshold" may be "equal to or more than the threshold".

With the configuration, the controller of the electric power conversion system controls the voltage converter such that the voltage at the low-voltage end becomes equal to the voltage at the high-voltage end, when a current flowing to the inverter or electric power consumed in the traveling motor is larger than a threshold. In the case of a chopper voltage converter, the voltage at the high-voltage end may be adjusted to be equal to the voltage at the low-voltage end by keeping a switching element that is involved in voltage step-down in an ON state (in the case of a bidirectional DC-DC converter, a switching element involved in voltage step-down is kept in the ON state, while a switching element involved in boosting is kept in an OFF state). This makes it possible to prevent generation of a pulsating current and to suppress generation of heat in the switching elements and the reactor.

In the electric power conversion system, the prescribed current threshold and the prescribed electric power threshold may be determined based on a rotational speed and an output torque of the traveling motor. Generally, the characteristics of a motor are expressed by a graph called a TN diagram. The TN diagram is a graph when a horizontal axis indicates the rotational speed of the motor and a vertical axis indicates the output torque of the motor. On the TN diagram, a curve of a constant output electric power of the motor can be plotted. When the above-described threshold is expressed with a unit of electric power, the threshold can be expressed as a curve on the TN diagram. With the configuration, the threshold is determined based on the rotational speed and the output torque of the traveling motor, the threshold of electric power can be calculated from a target rotational speed and a target torque.

In the electric power conversion system, the voltage converter may be a bidirectional DC-DC converter including a voltage step-down function for stepping down the voltage of the high-voltage end and outputting the voltage of the high-voltage end from the low-voltage end, and a boosting function for boosting the voltage of the low-voltage end and outputting the voltage of the low-voltage end from the high-voltage end. The low-voltage end of the voltage converter may be connected to a charging port. With the configuration, when the direct-current power source is a rechargeable secondary battery, the voltage of an external power source is boosted with the voltage converter included in the electric power conversion system and is used to charge the secondary battery. This eliminates the necessity of a voltage regulator for the external power source.

In the electric power conversion system, the controller may be configured to control the switching elements such that the voltage of the low-voltage end becomes equal to the voltage of the high-voltage end in a fifth state irrespective of the magnitude of the current flowing to the inverter or the electric power consumed in the traveling motor. The fifth state may be at least one state out of a state where the temperature of the switching elements exceeds a first prescribed temperature threshold, and a state where the temperature of the reactor exceeds a second prescribed temperature threshold. The terms "first prescribed temperature threshold and second prescribed temperature threshold" refer to protection temperatures in order to prevent failure of the switching elements and the reactor. With the configuration, the switching elements or the reactor can be prevented from overheating irrespective of the magnitude of the current flowing to the inverter or the electric power consumed in the traveling motor.

In the electric power conversion system, the voltage converter may include a semiconductor element connected between the positive electrode line and the negative electrode line, and an overcurrent protection device connected in series to the semiconductor element. With the configuration, even when the semiconductor element is short-circuited, the overcurrent protection device separates the semiconductor element, so that the short-circuit can be cancelled. When the overcurrent protection device operates, the step-down operation by the voltage converter becomes inoperable. However, the voltage same as an input voltage can still be output. That is, even after the overcurrent protection device operates, it is possible to keep on driving the traveling motor.

In the electric power conversion system, a magnetic saturation current of the reactor may be smaller than a maximum input current of the inverter. In other words, since the reactor is not used when the current is large, a large-sized reactor that functions when the input current of the inverter is maximum is unnecessary.

In the electric power conversion system, the voltage converter may include a first semiconductor module that houses the switching elements. The inverter may include second semiconductor modules that house power conversion switching elements. The reactor may be provided between the first semiconductor module and the second semiconductor modules. With the configuration, a bus bar that connects the first semiconductor module and the second semiconductor module to the reactor is easily cabled.

A second aspect of the present disclosure is a control method of an electric power conversion system. The electric power conversion system includes: an inverter; a voltage converter; and a controller. The inverter is configured to supply alternating-current electric power to the traveling motor. The voltage converter has a high-voltage end connected to the direct-current power source and a low-voltage end connected to the inverter. The voltage converter includes switching elements and a reactor, and is configured to step down a voltage of the direct-current power source and supply the voltage of the direct-current power source to the inverter. The controller is configured to control the voltage converter. The control method includes: controlling, by the controller, the switching elements such that a voltage of the low-voltage end becomes lower than a voltage of the high-voltage end in a first state, the first state being at least one state out of a state where a current flowing to the inverter is less than a prescribed current threshold and a state where electric power consumed in the traveling motor is less than a prescribed electric power threshold; and controlling, by the controller, the switching elements such that the voltage of the low-voltage end becomes equal to the voltage of the high-voltage end in a second state, the second state being at least one state out of a state where the current flowing to the inverter is more than the prescribed current threshold and a state where the electric power consumed in the traveling motor is more than the prescribed electric power threshold.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
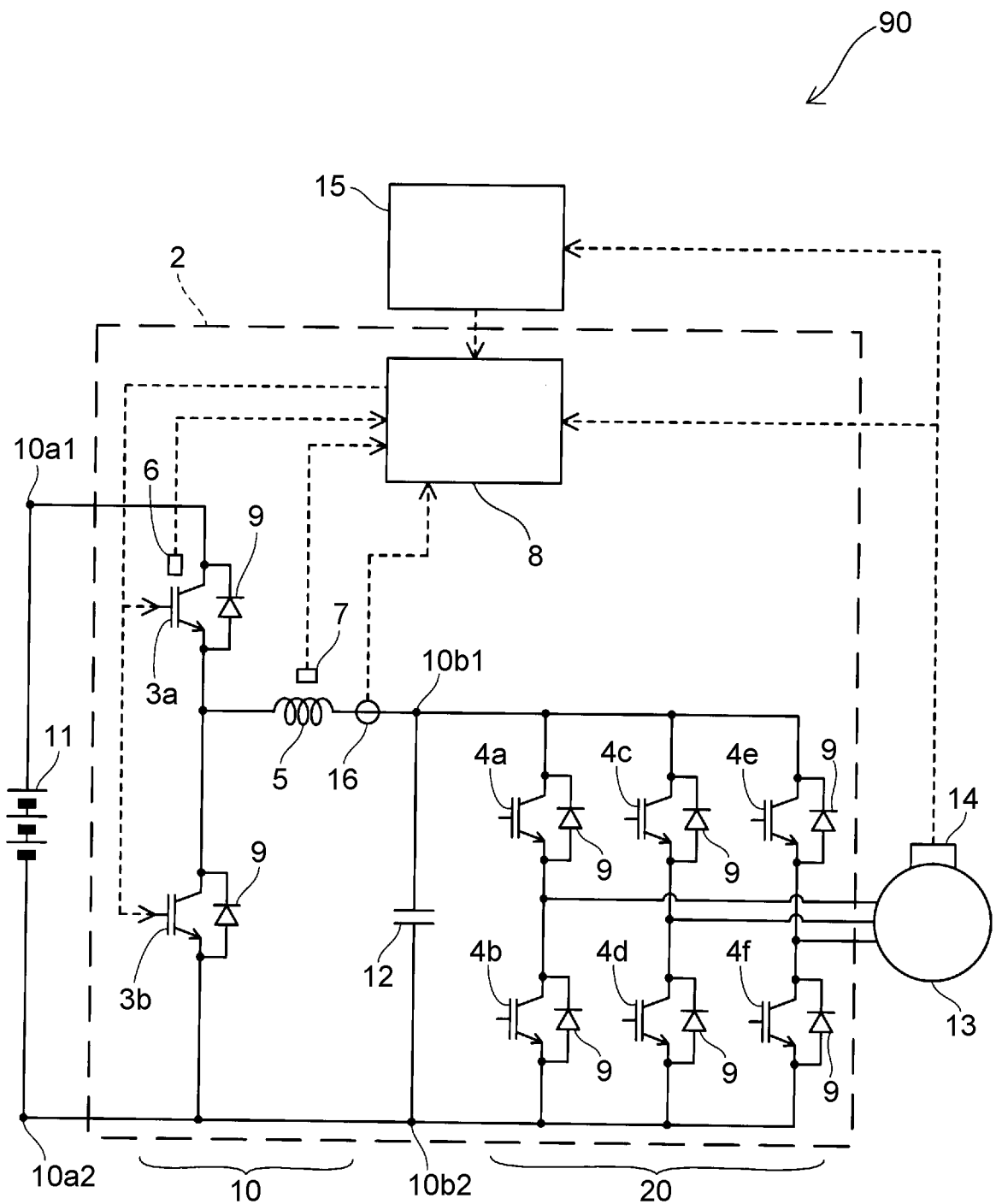
FIG. 1 is a block diagram showing an electric power system of an electric vehicle including an electric power conversion system of a first embodiment.

With reference to FIGS. 1 to 5, an electric power conversion system 2 of a first embodiment will be described. FIG. 1 shows a block diagram showing an electric power system of an electric vehicle 90 including the electric power conversion system 2. The electric vehicle 90 of the embodiment includes a battery 11, the electric power conversion system 2, a high order controller 15, and a traveling motor 13. The electric vehicle 90 travels by driving the motor 13 with the electric power of the battery 11. The electric power conversion system 2 is connected between the battery 11 and the motor 13. The electric power conversion system 2 converts direct-current electric power output from the battery 11 into alternating-current electric power suitable for driving of the motor 13.

The electric power conversion system 2 includes a voltage converter circuit 10, an inverter circuit 20, and an electric power controller 8.

First, the voltage converter circuit 10 will be described. The voltage converter circuit 10 has high-voltage ends (a high-voltage end positive electrode $10a1$, a high-voltage end negative electrode $10a2$) connected to the battery 11. The voltage converter circuit 10 has low-voltage ends (a low-voltage end positive electrode $10b1$, a low-voltage end negative electrode $10b2$) connected to the inverter circuit 20. For the convenience of description, a set of the high-voltage end positive electrode $10a1$ and the high-voltage end negative electrode $10a2$ is referred to as a high-voltage end $10a$, and a set of the low-voltage end positive electrode 10*b*1 and the low-voltage end negative electrode 10*b*2 is referred to as a low-voltage end 10*b*.

The voltage converter circuit 10 has a step-down function for stepping down a voltage applied to the high-voltage end 10*a* and outputting the stepped-down voltage to the low-voltage end 10*b*, and a boosting function for boosting a voltage applied to the low-voltage end 10*b* and outputting the boosted voltage to the high-voltage end 10*a*. That is, the voltage converter circuit 10 is a bidirectional DC-DC converter. The voltage applied to the low-voltage end 10*b* is the voltage of electric power (regenerative electric power) obtained when the motor 13 is reversely driven with deceleration energy of the vehicle.

Although the drive voltage of the motor 13 changes depending on a driver's accelerator work (accelerator operation amount) or the like, the maximum drive voltage is equal to the output voltage of the battery 11. That is, the motor 13 operates at a voltage equal to or less than the output voltage of the battery 11. The drive voltage of the motor 13 is determined by the accelerator operation amount or the like. For example, when the accelerator operation amount is large, the drive voltage of the motor 13 increases, whereas when the accelerator operation amount is small, the drive voltage also decreases. When a proper drive voltage of the motor 13 is lower than the output voltage of the battery 11, the electric power controller 8 operates the voltage converter circuit 10 to step down the output voltage of the battery 11 and supply the stepped-down voltage to the inverter circuit 20.

The circuit configuration of the voltage converter circuit 10 will be described. Two switching elements 3*a*, 3*b* are connected in series between the high-voltage end positive electrode 10*a*1 and the high-voltage end negative electrode 10*a*2. The switching elements 3*a*, 3*b* are connected in reverse parallel to diodes 9, respectively. Connected between a middle point of a series connection of the two switching elements 3*a*, 3*b* and the low-voltage end positive electrode 10*b*1 is a reactor 5. The low-voltage end negative electrode 10*b*2 and the high-voltage end negative electrode 10*a*2 are directly connected. As shown in FIG. 1, the voltage converter circuit 10 is of a chopper type including the switching elements 3*a*, 3*b* and the reactor 5.

The switching elements 3*a*, 3*b* complementarily operate such that one element is turned on when the other element is turned off. The switching element 3*a* is involved in a step-down operation, while the switching element 3*b* is involved in a boosting operation. The voltage converter circuit 10 operates such that a voltage ratio between the high-voltage end 10*a* and the low-voltage end 10*b* becomes a target voltage ratio. The direction of a current flow is determined depending on the balance between the voltage on the side of the high-voltage end 10*a* and the voltage on the side of the low-voltage end 10*b*.

The electric power controller 8 controls the switching elements 3*a*, 3*b*. In FIG. 1, dashed arrows represent signal lines. The voltage converter circuit 10 includes a temperature sensor 6 that measures the temperature of the switching element 3*a*, a temperature sensor 7 that measures the temperature of the reactor 5, and a current sensor 16 that measures the current flowing through the reactor 5. Measurement data by the temperature sensors 6, 7 and the current sensor 16 is sent to the electric power controller 8. The electric power controller 8 regulates the current flowing through the voltage converter circuit 10 to prevent the switching element 3*a* and the reactor 5 from overheating.

The inverter circuit 20 will be described. The inverter circuit 20 includes six switching elements 4*a*-4*f* and six diodes 9. The diodes 9 are connected in reverse parallel to the switching elements 4*a*-4*f*, respectively. The six switching elements 4*a*-4*f* are paired to form series connections. Three series connections are connected in parallel. When the switching elements 4*a*-4*f* properly repeat on-off operation, an alternating current is output from middle points of the respective series connections. The electric power controller 8 also controls the six switching elements 4*a*-4*f*. In FIG. 1, illustration of signal lines from the electric power controller 8 to the switching elements 4*a*-4*f* is omitted.

Between the voltage converter circuit 10 and the inverter circuit 20, a smoothing capacitor 12 is connected in parallel. In other words, the smoothing capacitor 12 is connected between the low-voltage end positive electrode 10*b*1 and the low-voltage end negative electrode 10*b*2 of the voltage converter circuit 10. The smoothing capacitor 12 suppresses pulsation of the current flowing between the voltage converter circuit 10 and the inverter circuit 20.

The motor 13 is equipped with a rotational speed sensor 14 that measure the rotational speed of the motor 13. The measurement data of the rotational speed sensor 14 is also sent to the electric power controller 8. The electric power controller 8 controls the switching elements of the voltage converter circuit 10 and the inverter circuit 20 also in consideration of the rotational speed of the motor 13 measured with the rotational speed sensor 14.

The electric power controller 8 is connected to the high order controller 15. The high order controller 15 determines a target output torque of the motor 13 based on information such as the accelerator operation amount. The target output torque is sent to the electric power controller 8.

As stated before, the drive voltage of the motor 13 is equal to or less than the output voltage of the battery 11. Upon reception of the target output torque, the electric power controller 8 determines a target voltage of the voltage converter circuit 10, and a target frequency of the output alternating current of the inverter circuit 20. The electric power controller 8 controls the switching elements 3*a*, 3*b* of the voltage converter circuit 10 and the switching elements 4*a*-4*f* of the inverter circuit 20 such that the determined target voltage and target frequency are achieved. The switching elements 3*a*, 3*b* and the reactor 5 generate a large amount of heat. The electric power controller 8 controls the switching elements 3*a*, 3*b* so as to prevent the switching elements 3*a*, 3*b* (switching element 3*a* that involves in voltage step-down in particular) and the reactor 5 from overheating. When the electric power consumed in the motor 13 exceeds a prescribed threshold (electric power threshold Pth), the electric power controller 8 controls the voltage converter circuit 10 such that the voltage of the low-voltage end 10*b* becomes equal to the voltage of the high-voltage end 10*a*. Specifically, the electric power controller 8 keeps the switching element 3*a* in an ON state, while keeping the switching element 3*b* in an OFF state. As a consequence, the high-voltage end positive electrode 10*a*1 and the low-voltage end positive electrode 10*b*1 are in a connected state at all the time, so that the voltages on both the ends become equal.

A preferable drive voltage of the motor 13 changes with the accelerator operation amount or the like. In the electric power conversion system 2 of the embodiment, priority is given to preventing the switching element 3*a* or the reactor 5 from overheating. When large electric power is expected to flow into the switching element 3*a* or the reactor 5, the switching element 3*a* is kept in the ON state, while the switching element 3b is kept in the OFF state. Hence, pulsation of the current relating to on-off of the switching elements 3a, 3b is eliminated, and heat generation in the switching element 3a and the reactor 5 is suppressed.

The electric power controller 8 constantly monitors the temperature of the switching element 3a and the temperature of the reactor 5 with the temperature sensors 6, 7. When the temperature of the switching element 3a or the reactor 5 exceeds a temperature threshold, the electric power controller 8 keeps the switching element 3a in the ON state, while keeping the switching element 3b in the OFF state irrespective of the magnitude of the electric power consumed in the motor 13. That is, the electric power controller 8 controls the switching elements 3a, 3b such that the voltage of the high-voltage end 10a and the voltage of the low-voltage end 10b become equal. This makes it possible to prevent further increase in temperature of the switching element 3a and the reactor 5.

Figure 2:
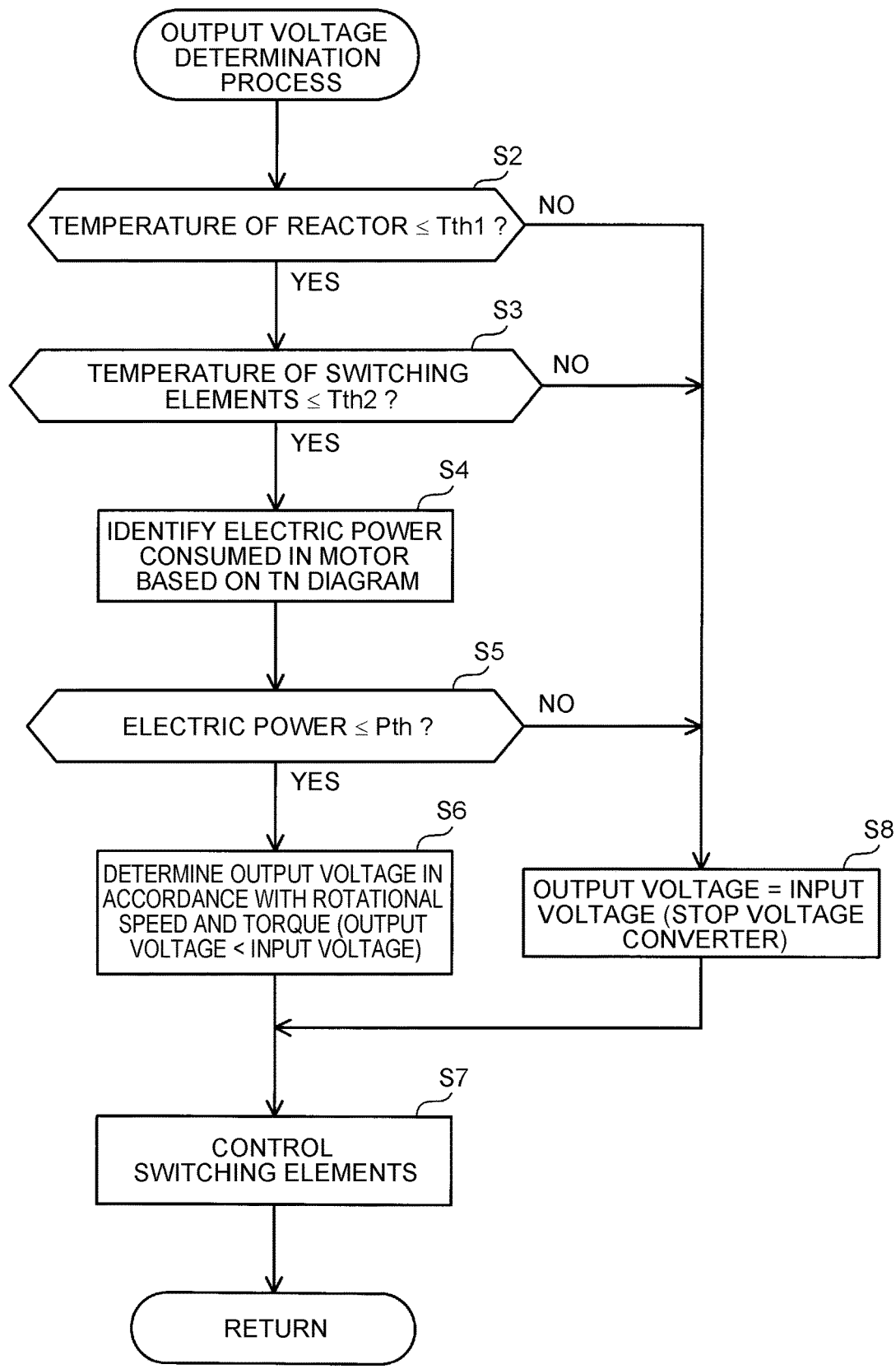
FIG. 2 is a flowchart of a process of determining an output voltage of a voltage converter.

FIG. 2 shows a flowchart of an output voltage determination process executed by the electric power controller 8. The process of the electric power controller 8 will be described with reference to FIG. 2. The process of FIG. 2 is periodically executed.

The electric power controller 8 acquires data from the temperature sensors 6, 7, and compares the data with the temperature threshold. Specifically, the electric power controller 8 compares the temperature measured by the temperature sensor 7 (i.e., the temperature of the reactor 5) with a first temperature threshold Tth1 (step S2). When the temperature of the reactor 5 exceeds the first temperature threshold Tth1 (step S2: NO), the electric power controller 8 shifts to the process of step S8. In step S8, the electric power controller 8 sets, as an output voltage, a value same as an input voltage. The electric power controller 8 then controls the switching elements 3a, 3b (step S7). As described before, when step S8 is executed, the electric power controller 8 keeps the switching element 3a in the ON state, and keeps the switching element 3b in the OFF state in step S7.

When the temperature of the reactor is equal to or less than the first temperature threshold Tth1 (step S2: YES), the electric power controller 8 compares the temperature measured by the temperature sensor 6 (that is, the temperature of the switching element 3a) with a second temperature threshold Tth2 (step S3). When the temperature of the switching element 3a exceeds the second temperature threshold Tth2, the electric power controller 8 sets, as an output voltage, a value same as an input voltage as in the case of step S2 (step S3: NO, S8).

When the temperature of the switching element 3a is equal to or less than the second temperature threshold Tth2 (step S3: YES), the electric power controller 8 identifies the electric power consumed in the motor 13 based on the TN diagram (step S4). When the electric power consumed in the motor 13 exceeds the prescribed electric power threshold Pth (step S5: NO, S8), the electric power controller 8 sets, as output electric power, a value same as an input electric power.

Figure 3:
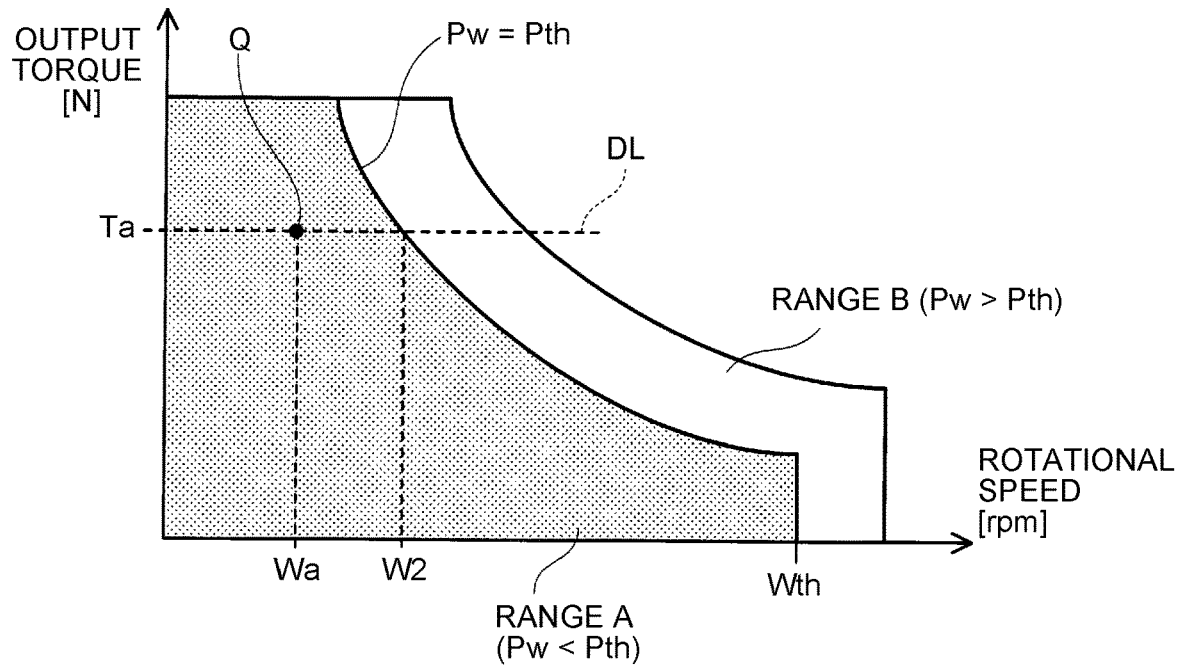
FIG. 3 is one example of a TN diagram of a motor.

The process of step S4, S5 will be described. FIG. 3 is a TN diagram having a horizontal axis indicating the rotational speed of the motor 13 and a vertical axis indicating the output torque of the motor 13. When a current rotational speed of the motor 13 and a target output torque of the motor 13 are determined, a position in the graph of FIG. 3 is identified. In the TN diagram, equal electric power lines can be depicted. In the TN diagram of FIG. 3, a curve of the electric power Pw=electric power threshold Pth is depicted.

A range A in FIG. 3 (gray range) represents the range where the output electric power Pw of the motor 13 relative to the target output torque is smaller than the electric power threshold Pth. A range B represents the range where the output electric power Pw of the motor 13 relative to the target output torque is larger than the electric power threshold Pth. The output electric power Pw of the motor 13 is equivalent to the electric power consumed in the motor 13. The electric power controller 8 refers to the TN diagram to check whether or not the output electric power Pw of the motor 13 exceeds the electric power threshold Pth based on the target output and the current rotational speed of the motor 13. When the output electric power Pw of the motor 13 (that is, the electric power consumed in the motor 13) exceeds the electric power threshold Pth, the electric power controller 8 sets, as an output voltage of the voltage converter circuit 10, a value same as the input voltage (step S5: NO, S8). In this case, as described before, the electric power controller 8 keeps the switching element 3a in the ON state while keeping the switching element 3b in the OFF state in the process of step S7.

When the electric power Pw consumed in the motor 13 does not exceed the electric power threshold Pth (step S5: YES), the electric power controller 8 determines the output voltage of the voltage converter circuit 10 based on the rotational speed of the motor 13 (step S6).

Figure 4:
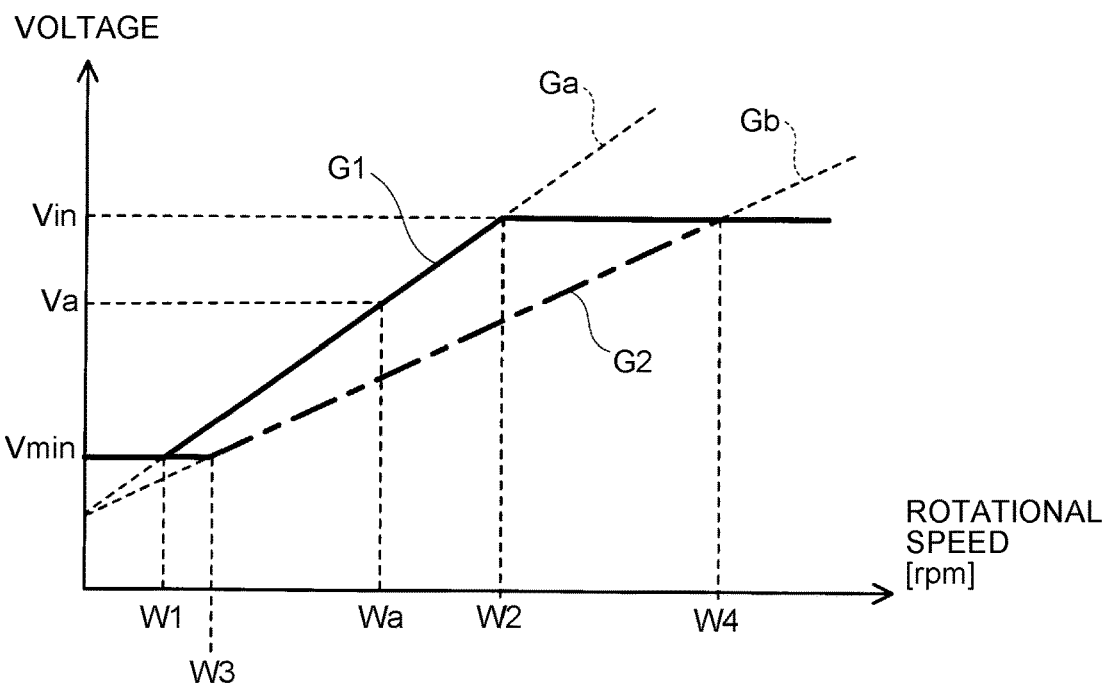
FIG. 4 is one example of an output voltage map of the voltage converter.

The process of determining the output voltage will be described with reference to FIGS. 3 and 4. The electric power controller 8 stores a map (output voltage map) that defines a relationship between the rotational speed of the motor 13 with the output torque being constant and the output voltage of the voltage converter circuit 10. FIG. 4 shows one example of the output voltage map. The horizontal axis of FIG. 4 represents the rotational speed of the motor 13, and the vertical axis represents the output voltage of the voltage converter circuit 10. For example, when the rotational speed at a current time is Wa, and the target output torque of the motor 13 is Ta, a point Q can be identified on the TN diagram of FIG. 3. A broken line DL in FIG. 3 is a line extending through the point Q with the output torque being constant at Ta. A map that defines a relationship between the rotational speed and the output voltage on this line is the map of FIG. 4. The map same as FIG. 4 is prepared for every output torque for the electric power controller 8.

A description is given of the map of FIG. 4. A graph G1 of a thick line determines the output voltage of the voltage converter circuit 10 relative to the rotational speed of the motor 13. A graph Ga of a dotted line represents a voltage required for maximum efficiency phase control of the motor 13. The voltage required for maximum efficiency phase control is proportional to the rotational speed of the motor 13 as shown by the graph Ga. In this example, while the rotational speed of the motor 13 is from W1 to W2, the output voltage of the voltage converter circuit 10 is determined in accordance with the rotational speed of the motor 13 on the graph Ga (voltage required for maximum efficiency phase control). For example, when the rotational speed of the motor 13 is Wa, the output voltage of the voltage converter circuit 10 is determined to be a voltage Va from the graph G1.

A voltage Vmin is a minimum voltage that can stably be output by the voltage converter circuit 10. Therefore, when the rotational speed is lower than W1, the output voltage of the voltage converter circuit 10 is set to the voltage Vmin. In the range where the electric power consumed in the motor 13 is smaller than the electric power threshold Pth, the output voltage of the voltage converter circuit 10 becomes a value lower than the input voltage.

A range where the rotational speed is larger than W2 belongs to the range B of FIG. 3. In the range B, as described before, the output voltage of the voltage converter circuit 10 is determined to be an input voltage Vin regardless of the electric power consumed in the motor 13. The input voltage Vin is equal to the output voltage of the battery 11.

In the above example, the output voltage of the voltage converter circuit 10 is determined based on the voltage required for maximum efficiency phase control of the motor 13. The output voltage of the voltage converter circuit 10 may be determined based on the voltage required for field-weakening control instead of the maximum efficiency phase control. The voltage required for field-weakening control is also proportional to the rotational speed of the motor 13. A graph Gb of FIG. 4 represents the voltage of the motor 13 required for field-weakening control. The output voltage may be determined to be proportional to the rotational speed of the motor 13 along with the graph Gb. However, the minimum value of the output voltage is still the voltage Vmin, and the maximum value is the voltage Vin.

See the flowchart of FIG. 2 again. Once the output voltage is determined in step S6, the electric power controller 8 controls the switching elements 3a, 3b of the voltage converter circuit 10 such that the determined output voltage is achieved.

When the electric power supplied to the motor 13 (that is, electric power Pa consumed in the motor 13) exceeds the electric power threshold Pth, the voltage converter circuit 10 keeps the switching element 3a in the ON state while keeping the switching element 3b in the OFF state such that the output electric power may become equal to the input electric power. As a result, a pulsating current is prevented from flowing to the switching element 3a and the reactor 5, and thereby generation of heat is suppressed. When the electric power consumed in the motor 13 is less than the electric power threshold Pth, the electric power controller 8 controls the switching elements 3a, 3b such that the output voltage of the voltage converter circuit 10 becomes lower than the input voltage. The electric power conversion system 2 of the embodiment can suppress generation of heat by keeping the switching element 3a in the ON state, when large electric power is supplied to the motor 13.

Figure 5:
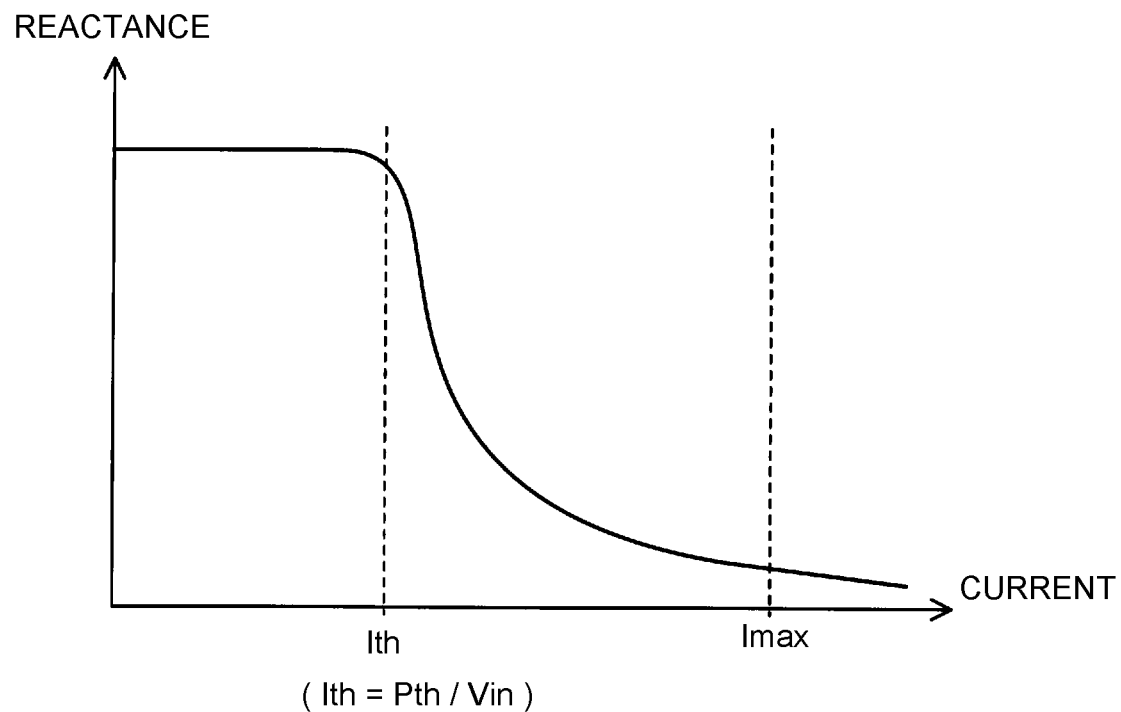
FIG. 5 is a graph showing one example of the characteristics of a reactor.

Now, the characteristics of the reactor 5 will be described. FIG. 5 shows a graph when the horizontal axis indicates a current flowing to the reactor 5 and the vertical axis indicates reactance of the reactor 5. The reactance of the reactor rapidly lowers at a prescribed current value. The current value at which the reactance rapidly lowers is a magnetic saturation current Ith. A current Imax of FIG. 5 is a maximum current that flows to the motor 13. The magnetic saturation current Ith of the reactor 5 used for the electric power conversion system 2 of the embodiment may be smaller than the current Imax flowing to the motor 13. This is because the reactor 5 does not need to function when a large electric power flows into the motor 13. The voltage converter circuit 10 keeps the switching element 3a in the ON state, when the electric power consumed in the motor 13 exceeds the electric power threshold Pth. When the electric power consumed in the motor 13 is the electric power threshold Pth, the current flowing into the voltage converter circuit 10 is Pth/Vin. Here, the voltage Vin is an input voltage of the voltage converter circuit 10, which is equal to an output voltage VB of the battery 11. The upper limit of the current that flows into the reactor 5 when the step-down operation is required is Pth/VB. Hence, the magnetic saturation current Ith may be equal to the current value (Pth/VB). In other words, the magnetic saturation current of the reactor 5 may be smaller than the maximum value of the current that flows into the inverter circuit 20.

Figure 6:
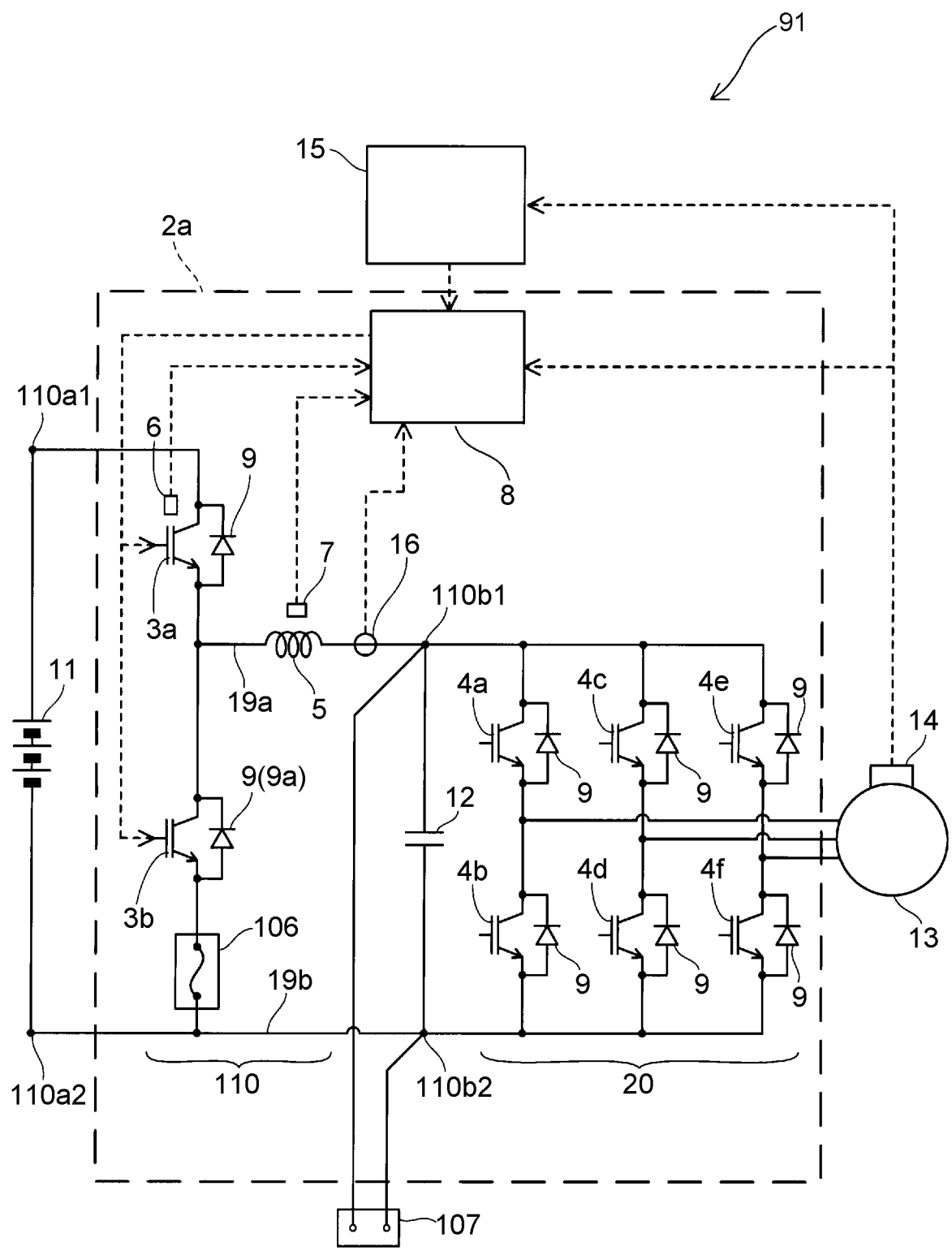
FIG. 6 is a block diagram showing an electric power system of an electric vehicle including an electric power conversion system of a second embodiment.

FIG. 6 shows a block diagram of an electric vehicle 91 including an electric power conversion system 2a of a second embodiment. The electric power conversion system 2a includes a voltage converter circuit 110, an inverter circuit 20, and an electric power controller 8. The voltage converter circuit 110 has a high-voltage end 110a connected to the battery 11, and a low-voltage end 110b connected to the inverter circuit 20. The electric power conversion system 2a is different from the electric power conversion system 2 of the first embodiment in that the electric power conversion system 2a includes an overcurrent protection device 106 and a charging port 107. Other configuration aspects are the same as the electric power conversion system 2 of the first embodiment. Therefore, description of the configuration other than the overcurrent protection device 106 and the charging port 107 is omitted.

Between a positive electrode line 19a and a negative electrode line 19b of the voltage converter circuit 110, a switching element 3b and the overcurrent protection device 106 are connected in series. The overcurrent protection device 106 is a fuse that is fused when a current of a prescribed magnitude or more flows. The voltage converter circuit 110 is a bidirectional DC-DC converter like the voltage converter circuit 10 of the first embodiment. The switching element 3b is involved in the boosting operation. The switching element 3b is connected between the positive electrode line 19a and the negative electrode line 19b. Accordingly, when the switching element 3b has a short fault, the positive electrode line 19a and the negative electrode line 19b are short-circuited, and a large current flows. However, when a large current flows, the overcurrent protection device 106 is immediately fused, which disconnects between the positive electrode line 19a and the negative electrode lines 19b. When the positive electrode line 19a and the negative electrode lines 19b are disconnected, the voltage converter circuit 110 is unable to perform the step-down operation. In that case, the electric power controller 8 keeps the switching element 3a in the ON state. When the switching element 3a is kept in the ON state, a high-voltage end positive electrode 110a1 and a low-voltage end positive electrode 110b1 are directly coupled, and the electric power of the battery 11 directly flows into the inverter circuit 20. Therefore, the electric vehicle 91 can keep on traveling.

The charging port 107 is connected between the low-voltage end positive electrode 110b1 and the low-voltage end negative electrode 110b2 of the voltage converter circuit 110. The charging port 107 may be connected to an external power source. As stated before, since the voltage converter circuit 110 is a bidirectional DC-DC converter, the voltage converter circuit 110 can boost the voltage input into the low-voltage end 110b, and output the boosted voltage from the high-voltage end 110a. Therefore, it is possible to connect an external power source, that is lower in voltage than the battery 11, to the charging port 107 and charge the battery 11.

A modification of the second embodiment will be described. An electric power conversion system of a modification does not include a switching element 3b. Such a voltage converter circuit 110 can perform step-down operation though it does not support boosting operation. In that case, a diode 9a and an overcurrent protection device 106 are connected in series between a positive electrode line 19a and a negative electrode line 19b. Even when the diode 9a has a short fault, and a large current flows between the positive electrode line 19a and the negative electrode line 19b, the overcurrent protection device 106 is fused, which disconnects between the positive electrode line 19a and the negative electrode lines 19b. Also in this case, the electric power controller 8 can keep the switching element 3a in the ON state, and the electric vehicle 91 can keep on traveling.

Figure 7:
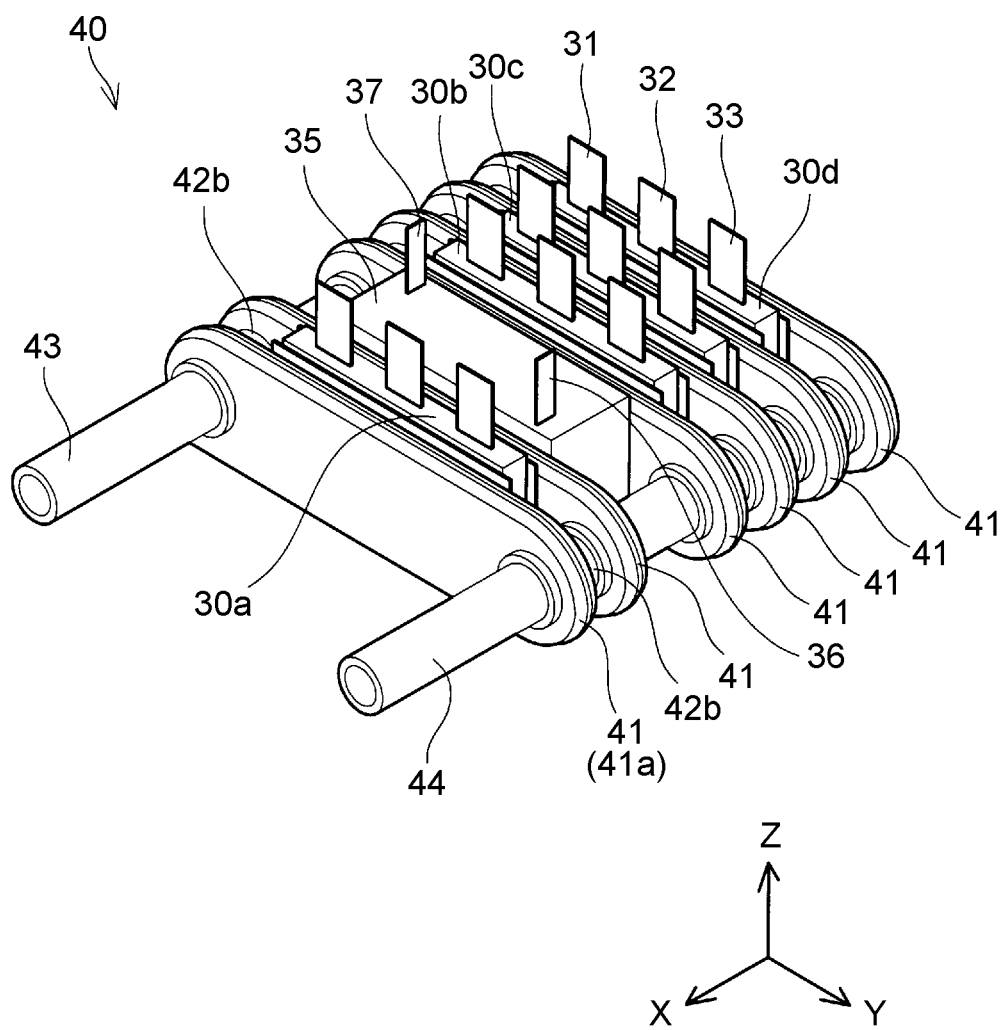
FIG. 7 is a perspective view of a stacking unit including an integration of switching elements and a reactor.
Figure 8:
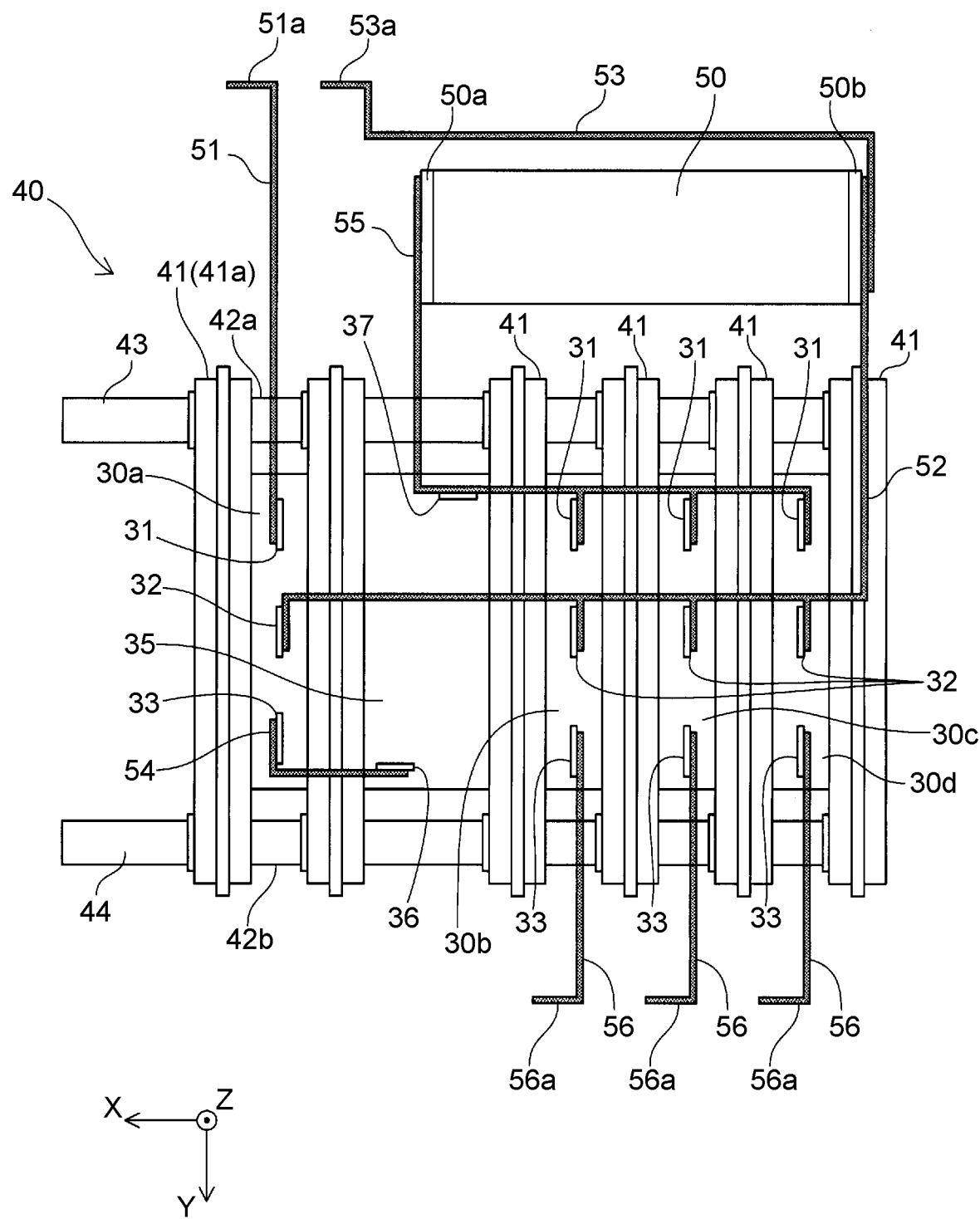
FIG. 8 is a plan view of the stacking unit.

With reference to FIGS. 7 and 8, part of the hardware of the electric power conversion system 2 (2a) will be described. FIG. 7 is a perspective view of a stacking unit 40, and FIG. 8 is a plan view of the stacking unit 40 connected to a bus bar. In FIG. 8, a capacitor element 50 is depicted in addition to the stacking unit 40. The capacitor element 50 is equivalent to the smoothing capacitor 12 of FIG. 1.

The stacking unit 40 is a device including an integration of the switching elements 3a, 3b included in the voltage converter circuit 10, the switching elements 4a-4f included in the inverter circuit 20, and a reactor 35. The reactor 35 is equivalent to the reactor 5 of FIG. 1.

The stacking unit 40 is constituted of a first semiconductor module 30a, second semiconductor modules 30b, 30c, 30d, a plurality of coolers 41, and the reactor 35. The first semiconductor module 30a houses the switching elements 3a, 3b of the voltage converter circuit 10, and the diodes 9 connected in reverse parallel to the switching elements, respectively. The switching elements 3a, 3b are connected in series in the first semiconductor module 30a.

The second semiconductor module 30b houses switching elements 4a, 4b of the inverter circuit 20, and the diodes 9 connected in reverse parallel to the switching elements, respectively. The switching elements 4a, 4b are connected in series inside the second semiconductor module 30b. The second semiconductor modules 30c, 30d have the same structure as the second semiconductor module 30b. The second semiconductor modules 30c, 30d each house two switching elements and two diodes. The second semiconductor modules 30b-30d have the same structure as the first semiconductor module 30a. Hereinafter, the first semiconductor module 30a and the second semiconductor modules 30b-30d are collectively referred to as the semiconductor modules 30. From one narrow-width surface of each of the semiconductor modules 30, a positive electrode terminal 31, a negative electrode terminal 32, and a middle point terminal 33 extend. Inside the semiconductor modules 30, each of the positive electrode terminals 31 is connected with a positive electrode side of each series connection of two switching elements, while each of the negative electrode terminals 32 is connected to a negative electrode side of each of the series connections. Inside the semiconductor modules 30, each of the middle point terminals 33 is connected with a middle point of each series connections of two switching elements.

The coolers 41 are linear tubes that carry a coolant. The coolers 41 are arranged in parallel, with the semiconductor modules 30 or the reactor 35 being interposed between the adjacent coolers 41.

The adjacent coolers 41 are connected through two connecting tubules 42a, 42b. Each of the linear coolers 41 has one longitudinal end that is connected to the connecting tubule 42a, and the other longitudinal end that is connected to the connecting tubule 42b. The cooler 41a at the end of a lining of the coolers 41 is connected to a supply pipe 43 and a discharge pipe 44. As viewed from a lining direction (X direction in the drawing) of the coolers 41, the supply pipe 43 is arranged to be overlapped with the connecting tubule 42a, and the discharge pipe 44 is arranged to be overlapped with the connecting tubule 42b. The supply pipe 43 and the discharge pipe 44 are connected to an unshown coolant circulation device. The coolant is supplied through the supply pipe 43 from the coolant circulation device. The coolant is distributed to all the coolers 41 through the connecting tubule 42a. The coolant absorbs the heat of the adjacent semiconductor modules 30 or the reactor 35, while flowing through the inside of the coolers 41. The coolant that absorbed heat is returned to the coolant circulation device through the connecting tubule 42b and the discharge pipe 44. Both sides of the semiconductor modules 30 and the reactor 35 are in contact with the coolers 41 such that the semiconductor modules 30 and the reactor 35 are cooled from both the sides thereof. The stacking unit 40 collectively cools the switching elements and the reactor 35.

FIG. 8 shows a plan view of the stacking unit 40. FIG. 8 also depicts bus bars 51-56 connected with each terminal of the semiconductor modules 30 and the capacitor element 50. The bus bars are conductive members formed from metal with a small internal resistance.

Cabling of the bus bars 51-56 will be described. The first bus bar 51 has one end connected to the positive electrode terminal 31 of the first semiconductor module 30a. The first bus bar 51 has the other end serving as a connection terminal 51a that is connected to a positive electrode line of a power cable extending from the battery 11. The other end (connection terminal 51a) of the first bus bar 51 corresponds to the high-voltage end positive electrode 10a1 of the voltage converter circuit 10.

The second bus bar 52 has one end connected to the negative electrode terminal 32 of the first semiconductor module 30a, and the other end connected to an electrode 50b of the capacitor element 50. The second bus bar 52 is also connected to the negative electrode terminals 32 of the second semiconductor modules 30b-30 in some midpoint. The second bus bar 52 is also connected to one end of the third bus bar 53 at a portion of the electrode 50b. The third bus bar 53 has the other end serving as a connection terminal 53a that is connected to a negative electrode line of the power cable extending from the battery 11. The other end (connection terminal 53a) of the third bus bar 53 corresponds to the high-voltage end negative electrode 10a2 of the voltage converter circuit 10. The second bus bar 52 and the third bus bar 53 are equivalent to the negative electrode lines of the voltage converter circuit 10 and the inverter circuit 20.

The fourth bus bar 54 connects between the middle point terminal 33 of the first semiconductor module 30a and the first terminal 36 of the reactor 35. The fifth bus bar 55 connects a second terminal 37 of the reactor 35, an electrode 50a of the capacitor element 50, and the positive electrode terminals 31 of the second semiconductor modules 30b-30d. The three sixth bus bars 56 connect with the middle point terminals 33 of the second semiconductor modules 30b-30d, respectively. The three sixth bus bars 56 have the other ends serving as connection terminals 56a. The other ends (connection terminals 56a) of the three sixth bus bars 56 are equivalent to three-phase alternating current output ends of the inverter circuit 20.

As clearly shown in FIG. 8, the semiconductor modules 30 and the reactor 35 (and the capacitor element 50) are connected in a compact and organized manner through the bus bars 51-56. The reactor 35 is arranged between the first semiconductor module 30a and the second semiconductor modules 30b-30d. Such arrangement achieves compact cabling of the bus bars 51-56 that connect the semiconductor modules 30 and the reactor 35.

The points of attention regarding the technique described in the embodiments will be described. In the embodiments, the electric power controller 8 adjusts the output voltage to be equal to the input voltage, when the electric power consumed in the motor 13 is larger than the electric power threshold Pth. The electric power controller 8 may change the output voltage by monitoring the current flowing into the inverter circuit 20 instead of the electric power consumed in the motor 13. The current (that is, the current measured by the current sensor 16) flowing through the reactor 5 of the voltage converter circuit 10 is supplied to the inverter circuit 20. Therefore, the current flowing into the inverter circuit 20 is measurable by the current sensor 16 of the voltage converter circuit 10. When the current flowing into the inverter circuit 20 is larger than a prescribed current threshold, the electric power controller 8 may be configured to adjust the output voltage to be equal to the input voltage.

The battery 11 is equivalent to one example of the direct-current power source. The direct-current power source may be a fuel cell. When the direct-current power source is a fuel cell, the voltage converter circuit may be a voltage step-down converter that can support only the step-down operation.

Although specific examples of the present disclosure have been described in detail in the foregoing, they are merely illustrative and are not intended to restrict the claims of the disclosure. The technique described in the claims includes various modifications and deformations of the specific examples illustrated in the foregoing. The technological components described in this specification or in the drawings demonstrate technical usefulness independently or in various kinds of combinations, and are not limited to the combinations disclosed in the claims at the time of filing application. The technique illustrated in this specification or in the drawings can concurrently achieve a plurality of objects. Accomplishing one of the objects itself provides the technical usefulness thereof.

What is claimed is:

1. An electric power conversion system that converts electric power of a direct-current power source into drive electric power of a traveling motor, the electric power conversion system comprising:
   an inverter configured to supply alternating-current electric power to the traveling motor;
   a voltage converter including a high-voltage end connected to the direct-current power source and a low-voltage end connected to the inverter, the voltage converter including switching elements and a reactor, and configured to step down a voltage of the direct-current power source and supply the voltage of the direct-current power source to the inverter; and
   a controller configured to control the voltage converter,
   the controller being configured to control the switching elements such that a voltage of the low-voltage end becomes lower than a voltage of the high-voltage end in a first state, the first state being at least one state out of a state where a current flowing to the inverter is less than a prescribed current threshold and a state where electric power consumed in the traveling motor is less than a prescribed electric power threshold,
   the controller being configured to control the switching elements such that the voltage of the low-voltage end becomes equal to the voltage of the high-voltage end in a second state, the second state being at least one state out of a state where the current flowing to the inverter is more than the prescribed current threshold and a state where the electric power consumed in the traveling motor is more than the prescribed electric power threshold, and
   the controller is configured to control the switching elements such that the voltage of the low-voltage end becomes equal to the voltage of the high-voltage end in a fifth state irrespective of a magnitude of the current flowing to the inverter or the electric power consumed in the traveling motor, the fifth state being at least one state out of a state where a temperature of the switching elements exceeds a first prescribed temperature threshold, and a state where a temperature of the reactor exceeds a second prescribed temperature threshold.

2. The electric power conversion system according to claim 1, wherein
   the controller is configured to control the switching elements such that the voltage of the low-voltage end becomes lower than the voltage of the high-voltage end in the first state, and
   the controller is configured to control the switching elements such that the voltage of the low-voltage end becomes equal to the voltage of the high-voltage end in a third state, the third state being at least one state out of a state where the current flowing to the inverter is equal to or more than the prescribed current threshold and a state where the electric power consumed in the traveling motor is equal to or more than the prescribed electric power threshold.

3. The electric power conversion system according to claim 1, wherein
   the controller is configured to control the switching elements such that the voltage of the low-voltage end becomes lower than the voltage of the high-voltage end in a fourth state, the fourth state being at least one state out of a state where the current flowing to the inverter is equal to or less than the prescribed current threshold and a state where the electric power consumed in the traveling motor is equal to or less than the prescribed electric power threshold, and
   the controller is configured to control the switching elements such that the voltage of the low-voltage end becomes equal to the voltage of the high-voltage end in the second state.

4. The electric power conversion system according to claim 1, wherein the prescribed current threshold and the prescribed electric power threshold are determined based on a rotational speed of the traveling motor and an output torque of the traveling motor.

5. The electric power conversion system according to claim 1, wherein
   the voltage converter is a bidirectional DC-DC converter including a voltage step-down function for stepping down the voltage of the high-voltage end and outputting the voltage of the high-voltage end from the low-voltage end, and a boosting function for boosting the voltage of the low-voltage end and outputting the voltage of the low-voltage end from the high-voltage end, and
   the low-voltage end of the voltage converter is connected to a charging port.

6. The electric power conversion system according to claim 1, wherein the voltage converter includes a semiconductor element connected between a positive electrode line and a negative electrode line, and an overcurrent protection device connected in series to the semiconductor element.

7. The electric power conversion system according to claim 1, wherein a magnetic saturation current of the reactor is smaller than a maximum input current of the inverter.

8. The electric power conversion system according to claim 1, wherein the voltage converter includes a first semiconductor module that houses the switching elements,
the inverter includes second semiconductor modules that house power conversion switching elements, and
the reactor is provided between the first semiconductor module and the second semiconductor modules.

9. A control method of an electric power conversion system that converts electric power of a direct-current power source into drive electric power of a traveling motor,
the electric power conversion system including: an inverter configured to supply alternating-current electric power to the traveling motor; a voltage converter including a high-voltage end connected to the direct-current power source and a low-voltage end connected to the inverter, the voltage converter including switching elements and a reactor, and configured to step down a voltage of the direct-current power source and supply the voltage of the direct-current power source to the inverter; and a controller configured to control the voltage converter,
the control method comprising:
controlling, by the controller, the switching elements such that a voltage of the low-voltage end becomes lower than a voltage of the high-voltage end in a first state, the first state being at least one state out of a state where a current flowing to the inverter is less than a prescribed current threshold and a state where electric power consumed in the traveling motor is less than a prescribed electric power threshold;
controlling, by the controller, the switching elements such that the voltage of the low-voltage end becomes equal to the voltage of the high-voltage end in a second state, the second state being at least one state out of a state where the current flowing to the inverter is more than the prescribed current threshold and a state where the electric power consumed in the traveling motor is more than the prescribed electric power threshold; and
controlling, by the controller, the switching elements such that the voltage of the low-voltage end becomes equal to the voltage of the high-voltage end in a fifth state irrespective of a magnitude of the current flowing to the inverter or the electric power consumed in the traveling motor, the fifth state being at least one state out of a state where a temperature of the switching elements exceeds a first prescribed temperature threshold, and a state where a temperature of the reactor exceeds a second prescribed temperature threshold.

* * * * *